United States Patent [19]

Dutcher

[11] 4,432,488
[45] * Feb. 21, 1984

[54] ROUND ICE CREAM CARTON

[75] Inventor: Daniel P. Dutcher, Woodbury, Minn.

[73] Assignee: Champion International Corporation, Stamford, Conn.

[*] Notice: The portion of the term of this patent subsequent to May 26, 1998 has been disclaimed.

[21] Appl. No.: 411,676

[22] Filed: Aug. 26, 1982

Related U.S. Application Data

[63] Continuation of Ser. No. 253,010, Apr. 10, 1981, abandoned.

[51] Int. Cl.³ .......................... B65D 3/04; B65D 3/08
[52] U.S. Cl. .................................... 229/21; 229/1.5 B; 229/4.5; 229/41 C; 229/48 SA
[58] Field of Search .............. 229/1.5 B, 4.5, 16 A, 229/21, 41 C, 48 R, 48 SA; 493/112, 158, 363

[56] References Cited

U.S. PATENT DOCUMENTS

| | | | |
|---|---|---|---|
| 2,088,832 | 8/1937 | Barbieri | 229/21 |
| 2,240,599 | 5/1941 | Amberg | 229/16 A |
| 2,925,208 | 2/1960 | Wood | 229/1.5 B |
| 3,381,877 | 5/1968 | Arneson | 229/21 |
| 3,633,814 | 1/1972 | Michetti | 229/21 |
| 3,918,629 | 11/1975 | Forbes | 229/21 |
| 4,194,676 | 3/1980 | Humphries | 229/21 |

Primary Examiner—Herbert F. Ross
Attorney, Agent, or Firm—Evelyn M. Sommer; John H. Mulholland; William W. Jones

[57] ABSTRACT

A cylindrically shaped, open, rimmed topped carton suitable for containing ice cream or the like includes a polygonal shaped base and a pair of side wall sections formed integral with the base which are joined together along mutual edges to provide an essentially cylindrical exterior surface defining a rimmed circular opening in one end of the carton opposite the base. A plurality of Y-shaped pleats are provided in lower portions of the side walls at circumferentially spaced intervals corresponding to the juncture of the edges defining the polygonal base to provide a smooth transition of the side walls from an angular cross-section at the base to a rimmed circular cross-section at the open end of the carton. A rolled rim extends outwardly from the cylindrical side walls to assure tight frictional engagement with a removable lid while also facilitating lid removal.

1 Claim, 3 Drawing Figures

ROUND ICE CREAM CARTON

This is a continuation of application Ser. No. 253,010 filed Apr. 10, 1981, now abandoned, and is a continuation-in-part of U.S. patent application Ser. No. 088,413, filed Oct. 26, 1979, now U.S. Pat. No. 4,269,346.

TECHNICAL FIELD

This invention generally relates to packaging cartons, and deals more particularly with a cylindrically shaped, open, rimmed topped carton and lid therefor suitable for packaging ice cream or the like.

BACKGROUND AND BRIEF DESCRIPTION OF THE INVENTION

Cylindrically shaped, open, rimmed topped cartons have frequently been used in the past for packaging of ice cream or the like. Although rectangularly shaped cartons for this purpose have also been employed to some extent in recent periods, the cylindrically shaped, or "round" ice cream carton tends to connote "homemade" or "old fashion" ice cream in the mind of the public and thus remains desirable for use with particular types of ice cream products to convey an impression of quality. In the past, round ice cream cartons of the type made from paper stock have been of an essentially multi-piece construction, typically including a separate bottom wall which is joined to one end of a cylindrically shaped sleeve. Various means have been devised to attach the bottom wall to the sleeve forming the side walls of the carton. These prior constructions have been less than completely satisfactory either becuse of the inadequate sealing of the bottom to the side walls, which resulted in leaking of the carton, or because the resulting construction was not sufficiently rigid to maintain the bottom in proper position, particularly when the ice cream had melted slightly and permeated the paper stock thereby weakening the same. Moreover, the use of a separate bottom and side walls to form the carton increased manufacturing costs as a result of the necessity of individually form separate sections of the carton and later attach the various sections together before erecting the carton into its completed form.

Known prior art cartons of the cylindrical type are less than desirable for a number of reasons including inadequate sealing between the lid and container, lack of structural integrity particularly in the base thereof, and a non-smooth transition in the shape of the side walls from an angularly shaped base on one end of the container to a round cross-section at the other end thereof. Thus, there is a need in the art for a cylindrically shaped ice cream carton which may be formed from a unitary sheet of paper stock and simply erected to form a strong, leakproof package having side walls with a smooth transition in the cross-section geometry thereof.

The present invention provides a round ice cream carton which eliminates the deficiencies inherent in prior art designs and provides a carton construction which is not only particularly economical from a manufacturing standpoint, but is exceptionally strong and not prone to allow leakage of the contents therefrom. According to the present invention, a cylindrically shaped, open topped ice cream carton is formed from a blank comprising a unitary sheet of paper stock cut and configured to present a polygonally shaped bottom panel having a pair of rectangularly shaped side wall panels joined by fold lines to diametrically opposite edges of the bottom panel. When erected, the lower edges of the side walls conformingly jointed to each of the plurality of edges defining the polygonal periphery of the bottom. The side walls are provided with a plurality of circumferentially spaced, Y-shaped pleats therein adjacent the juncture of the straight edges of the bottom to produce, without unnecessary score lines to promote leaks, a smooth and rapid transition of the side walls from a polygonal cross-section near the bottom thereof to a circular cross-section in intermediate and upper sections thereof. The paper stock defining the opening in the carton is rolled to form a bead-type rim which helps maintain the circular cross-section.

BRIEF DESCRIPTION OF THE DRAWINGS

In the drawings, which form an integral part of the specification and are to be read in conjunction therewith, and in which like parts are designated by like reference numerals and the various views.

DETAILED DESCRIPTION OF THE INVENTION

Figure 1:
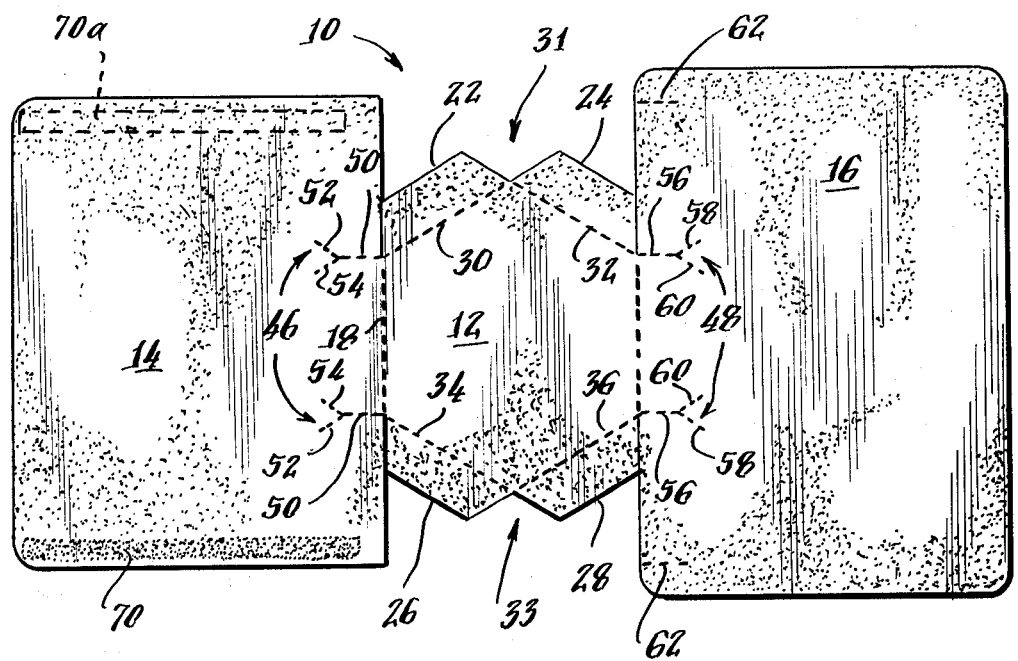
FIG. 1 is a plan view of a blank for forming a round ice cream carton.
Figure 2:
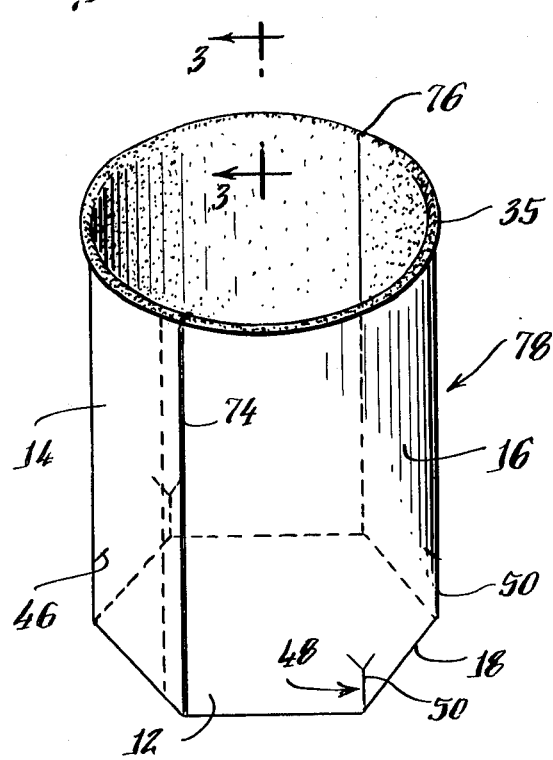
FIG. 2 is a perspective view of the carton erected from the blank shown in FIG. 2.

Referring first to FIGS. 1 and 2, a blank generally indicated by the numeral 10 includes a polygonally shaped bottom panel 12 interposed between a pair of spaced apart, rectangularly shaped side wall panels 14 and 16. Bottom panel 12 is regular in shape and includes three sets of diametrically opposed, parallel edges, two of which are joined by fold lines 18 and 20 to opposing parallel edges of side wall panels 14 and 16, respectively. Bottom panel 12 and side wall panels 14 and 16 are symmetrically positioned with respect to each other such that a horizontal reference axis extending through the mid point of bottom panel 12 divides the bottom panel 12, and side panels 14 and 16 into equal, top and bottom mirror-image halves except for the glue 70 and 70a which for opposite halves is on opposite sides. Panel 16 is larger than panel 14 in the direction perpendicular to the axis.

Bottom panel 12 is provided with polygonally shaped glue flaps 22, 24, 26 and 28, respectively joined thereto by fold lines 30, 32, 34 and 36, which latter mentioned fold lines define the remaining two sets of diametrically opposed edges of bottom panel 12.

Side wall panels 14 and 16 are each provided with a pair of spaced, Y-shaped score or crease lines therein, respectively generally designated by the numberls 46 and 48. More particularly, score lines 46 comprise a first leg 50 extending from a point adjacent the opposite extremities of score line 18, perpendicularly outward away from the latter, and further include a second and third leg 52 and 54, respectively connected to the first leg 50 and diverging away from each other outwardly from the bottom panel 12. Score lines 48 each include similar first, second and third legs 56, 58 and 60, respectively. Side wall panel 16 is also provided a second set of similar straight score lines 62 on opposite sides of score lines 48 and spaced outwardly from the latter. The spacing between each of the score lines 48 and 62 along the edge of the wall panel 16 coextensive with fold line 20 is essentially equal.

Side wall panel 14 is provided with a pair of preapplied adhesive strips 70 and 70a along two opposite edges thereof. The adhesive strip 70a is located on the side of panel 14 opposite strip 70 to facilitate the formation of rim 35 by rotation in one direction.

One side of the blank 10, which defines the interior of the carton when folded, is provided with a suitable coating 73 of moisture resistant material thereon, such as polyethylene or the like.

The first step in folding the blank 10 to form a round ice cream carton involves the step of pivoting the glue flaps 22, 24, 26 and 28, 90° upwardly about their respective fold lines 30, 32, 34 and 36, to an essentially upright position.

Side wall panels 14 and 16 are pivoted 90° upwardly about the respectively associated fold lines 18 and 20, to an upright position. Adhesive is then applied to the outer surfaces of glue flaps 22, 24, 26 and 28 and strips 70 and 70a applied to opposite sides of panel 14. The opposite extremities of side wall panel 16 on opposite ends of fold line 20 are folded toward side wall panel 14 and into face-to-face overlapping relationship to the adjacent glue flaps 24 and 28; the length of panel 16 is larger than that of panel 14 and sufficient in order that the lower opposite extremities thereof slightly overlap portions of the glue flaps 22 and 26 as well. Next, the opposite lateral sides of side wall panel 14 are folded inwardly toward side wall panel 16 whereby to overlap the corresponding vertical edges of panel 16 with glue strips 70 and 70a in face-to-face contact therewith. The adhesive strips 70 and 70a may then be pressed against the edges of panel 16 whereby to join the vertical edges of side wall panels 14 and 16 to form a generally cylindrically shaped tube. The lower edges of side wall panel 14 overlap the exterior surface areas of glue flaps 22 and 26 and become fastened to the latter by the adhesive applied therebetween. Finally, the carton is faced against a rotating rimming tool to produce the rim 35. The edges 74 and 76 extend oppositely such that the rotation during rimming creates relative movement down or radially inwardly with respect to the edge 74 from panel 14 to panel 16 and down or radially inwardly at it moves from panel 16 to panel 14 to create bead 35. This is in contrast to the problem of having to go up or outwardly against one edge in the carton as disclosed in U.S. Pat. No. 3,381,877.

Figure 3:
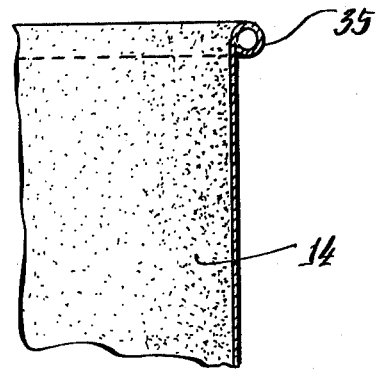
FIG. 3 is a cross-sectional view taken along the line 3—3 in FIG. 2.

Referring now also to FIG. 3, the erected carton generally indicated by the numeral 78 includes a polygonal base 12 having cylindrically shaped side wall sections 14 and 16 formed integral therewith and extending upwardly therefrom. The lower areas of side wall sections 14 and 16 conform to the six edges of equal length of the bottom 12 defining the latter's periphery. Y-shaped pleats 46 and 48 are disposed at the juncture of adjacent straight sections of the edges defining the periphery of the bottom wall 12 and function to effect a smooth transition in the outer side walls of the carton from the angular shape thereof imposed by the base 12 to an essentially circular cross-section in intermediate and upper regions thereof. Thus, the opening at the top of the carton 78 is essentially circular in configuration.

The lower regions of the carton 78 are effectively sealed against possible leakage by virtue of the overlapping glue flaps 22, 24, 26 and 28 which are sealed to the interior surface areas of the respectively corresponding side wall sections 14 and 16, and by virtue of the continuity of material on opposite sides of the fold lines 18 and 20.

The adhesively joined and sealed overlapping edges of the side wall sections 14 and 16 eliminate a possibility of leaking therebetween and provide a substantial, longitudinally extending joint which securely holds the sections 14 and 16 in the desired positions thereof. The previously discussed bead 35 provides a rim to further reinforce the upper edges of the side wall sections 14 and 16 and provide surface areas radially spaced outward from the corresponding side wall sections 14 and 16 whereby to permit retention of a lid on the carton 78.

What is claimed is:

1. A cylindrically shaped, open-topped carton formed from a unitary sheet of paper stock having a coating of moisture resistant material thereon and having a smooth beaded rim formed by a spinning means comprising:
   an essentially flat base having at least three sets of opposed, essentially parallel edges,
   a pair of side wall sections each respectively having sides and an end joined by a fold line to one of said base edges and extending upwardly from said base,
   first and second pairs of polygonal flap members having four or more straight sides respectively joined by corresponding fold lines to adjacent base edges in said second and third sets thereof, each of said flap members extending upwardly from said base and being joined in face-to-face relationship with interior surface areas of certain of said side wall sections,
   at least some of said side wall sections being provided at the ends of said parallel edges of said base with a plurality of Y-shaped pleats, which include a straight vertical leg for engagement with a surface which prevents rotation of the carton with the spinning means at it spins to form said rim bead, said Y-shaped pleats having straight angularly extending arms tending to produce a smooth, substantially unscored and leakfree transition in the shape of said side wall sections from a polygonal shape adjacent said base to an essentially circular shape at the end thereof distal from said base,
   a smooth circular bead at said end,
   each of said side wall sections being glued on the inside of one of its edges and on the outside of its opposite edge to the other of its side edges whereby the formation of said smooth circular bead is enhanced by the spinning means not having to move against a side edge of said side wall sections but moving downwardly over both of said side edges.

* * * * *

UNITED STATES PATENT AND TRADEMARK OFFICE
CERTIFICATE OF CORRECTION

PATENT NO. : 4,432,488
DATED : February 21, 1984
INVENTOR(S) : DANIEL P. DUTCHER It is certified that error appears in the above—identified patent and that said Letters Patent is hereby corrected as shown below:

Col. 1, line 33, delete "becuse" and insert in lieu thereof -- because -- ;

Col. 1, line 42, delete "of individually form" and insert in lieu thereof -- of individually forming -- ;

Col. 1, line 43, delete "attach" and insert in lieu thereof -- attaching -- ;

Col. 2, line 54, delete "numberls" and insert in lieu thereof -- numbers -- ;

Col. 4, line 43, delete "at it" and insert in lieu thereof -- as it -- ;

Col. 4, line 52, delete "its edges" and insert in lieu thereof -- its side edges -- .

Signed and Sealed this

Tenth Day of July 1984

[SEAL]

Attest:

GERALD J. MOSSINGHOFF

Attesting Officer

Commissioner of Patents and Trademarks